United States Patent Office 2,938,736
Patented May 31, 1960

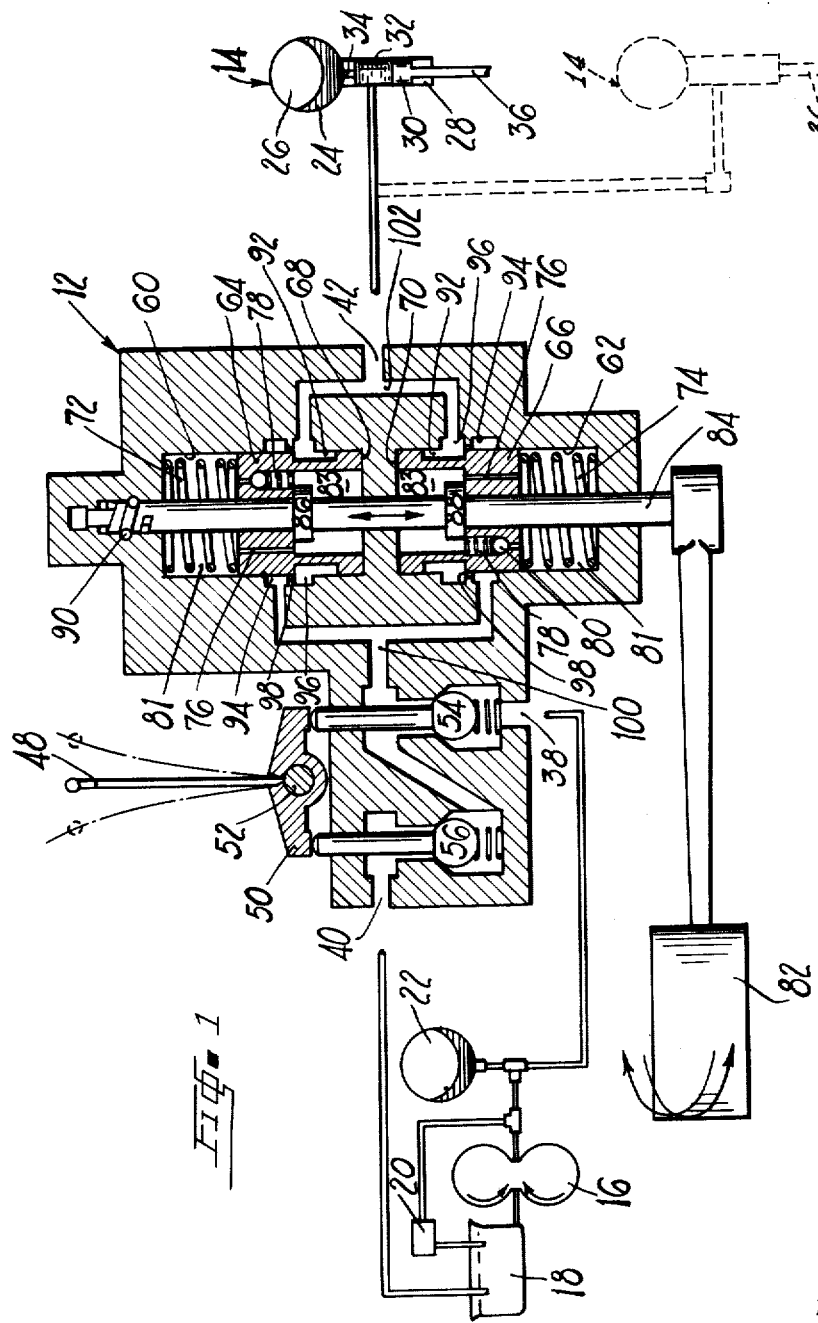

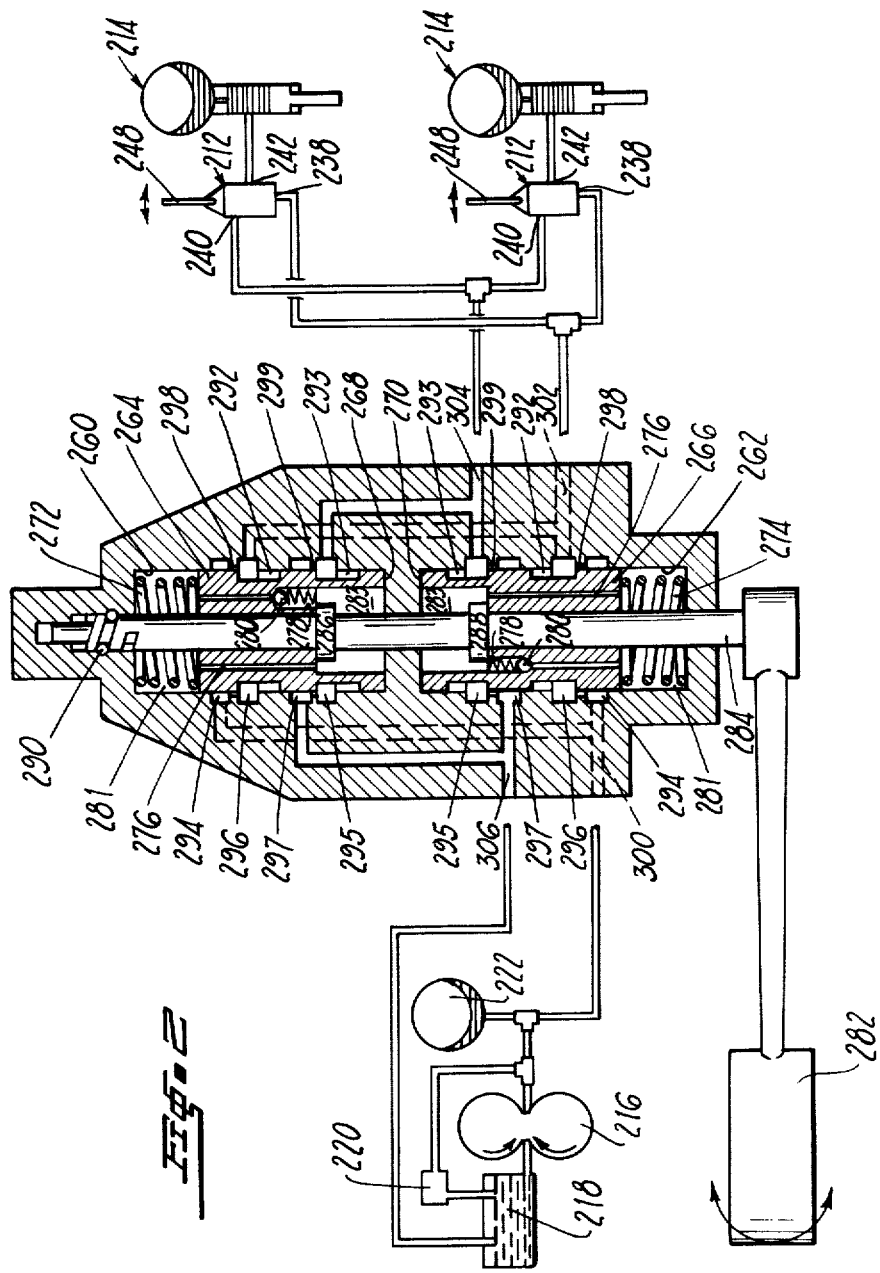

2,938,736

DEVICE FOR REGULATING THE RESPONSE RATE OF FLUID SUSPENSION UNITS

Curtis L. Brown, South Bend, Ind., assignor to Bendix Aviation Corporation, South Bend, Ind., a corporation of Delaware Filed May 22, 1957, Ser. No. 660,927

12 Claims. (Cl. 280—124)

This invention relates to a fluid suspension system for a vehicle and more particularly to a device for controlling the rate of flow between the leveling valves and the suspension units in such suspension system.

In order to achieve the best possible riding characteristics under various load and road conditions, it is highly desirable to have an automatic leveling valve which will correct for changes in the height of the vehicle due to increase or decrease in loading and in addition correct for the usual "roll," "dive" and "squat" attitudes that may be assumed by a vehicle as a result of the inertia forces developed while turning, braking or accelerating. On the other hand, it would be highly undesirable to attempt to correct for irregularities in the road such as a single bump or to correct for a single wheel disturbance of a short duration arising as a result of load irregularities. Since time would not permit the correction to be effected before the wheels had resumed their normal position, correcting for such minor irregularities or disturbances would simply result in a continuous "hunt" for a balanced vehicle position and result in high fluid consumption or drain of the hydraulic system.

In my copending application Serial No. 646,910, I utilized a damping means or dashpot in the leveling valve actuating mechanism to retard or delay the action of the vehicle input signals thereby preventing the leveling valve from instantaneously admitting or releasing pressurized fluid from the suspension unit or units. With such a dashpot, minor road irregularities and single wheel disturbances due to load irregularities would not actuate the leveling valve unless prolonged for a predetermined time interval. In order not to delay the action of input signals received as a result of vehicle "roll," "dive" or "squat," I incorporated an inertia controlled mechanism which permitted the dashpot associated with the valve actuating mechanism to operate under certain conditions but not under other conditions.

By eliminating the dashpot associated with the actuating mechanism and by placing a variable hydraulic restriction in the lines between the leveling valves and the suspension unit, the restriction being regulated by an inertia control mechanism, it is possible to fabricate a simpler unit and improve the sensitivity of the leveling valves. Furthermore, a faster suspension unit response rate would be provided since there would be no lost motion involved in the actuation of the leveling valves.

It is therefore an object of this invention to provide non-dashpotted leveling valves having greater sensitivity in conjunction with an inertia controlled device which regulates the rate of flow between the leveling valves and the suspension unit in a simple and efficient manner.

Another object of this invention is to provide an inertia controlled device which does not control the response rate of the leveling valves but instead controls the flow rate to and from the suspension units.

A further object of this invention is to provide a fluid suspension system having a hydraulic restriction in the lines between the leveling valves and the suspension unit for providing a normally slow suspension unit response rate and an inertia controlled device associated with the hydraulic restriction for enlarging the hydraulic restriction during certain driving conditions so that a faster response rate will occur.

The above and other objects and features of the invention will become apparent from the following description of the device taken in connection with the accompanying drawings which form a part of this specification and in which:

Figure 1 is a sectional view of a leveling valve and inertia controlled mechanism shown in connection with suspension means and the hydraulic circuit therefor; and Figure 2 is a sectional view of a modified inertia controlled mechanism shown in connection with suspension means and the hydraulic circuit therefor.

Referring to Figure 1, it will be seen that I have shown an automatic leveling valve 12 for regulating suspension unit 14 in connection with a central hydraulic system which may consist of a pump 16, a reservoir 18, an accumulator charging valve 20 and an accumulator 22. The suspension unit includes an accumulator 24 having a bladder 26 for confining a quantity of compressed gas, a hydraulic cylinder 28 having a piston 30 reciprocable therein, a hydraulic chamber 32 formed between the bladder 26 and the piston 30 and a damping valve 34 located in chamber 32. A strut 36 extending from the piston 30 may be connected to wheel attaching members (not shown) while the cylinder 28 may be suitably connected to the frame of the vehicle (not shown). The construction of the suspension unit is such that it will tend to act as a shock absorber.

Automatic leveling valve 12 has an inlet port 38, a return port 40 and a cylinder port 42. The position input signal obtained as a result of relative movement between the vehicle body and the wheels is transmitted to the leveling valve 12 through an elastic means illustrated as leaf spring lever 48. This signal in turn is transmitted to an actuating member 50 which pivots about pin 52. Pivotal movement of the actuating member will cause engagement and opening of the admission valve 54 or exhaust valve 56 which respectively admit or exhaust pressure fluid to and from the connected suspension unit 14. The admission or exhaust of fluid from chamber 32 of the suspension unit will result in a raising or lowering of the vehicle in response to the received signal.

An inertia controlled device shown connected to the automatic leveling valve 12 includes a bore 60 and a bore 62. Pistons 64 and 66 are reciprocable in bores 60 and 62, respectively, and are urged against shoulders 68 and 70 by springs 72 and 74. In each of the pistons 64 and 66 is a restriction 76 and a passage 78 having a check valve 80 therein which communicate chambers 81 and 83 in each of the bores. As a result of having the restrictions and check valves, free flow of fluid through the pistons is permitted when the pistons move against the springs and a restricted flow of fluid through the pistons when they are urged by the springs toward their respective shoulders. A weight 82 is pivotally connected to a rotatable and axially movable shaft 84 having flanges 86 and 88 abutting pistons 64 and 66 respectively. A spiral groove and ball means 90 is provided at one end of the shaft in order to provide axial movement of the shaft upon rotation thereof. This movement could also be accomplished by a yoke arrangement connecting the weight 82 directly or indirectly to the shaft. An annular channel 92 is formed on each of the pistons 64 and 66 and annular channels 94 and 96 are formed in each of the bores 60 and 62. Annular hydraulic restriction 98 communicates annular channels 94 with the adjacent annular channels 96 of the respective bores. These annular hydraulic restrictions 98, as shown, are formed by pistons 64 and 66 and their associated bores 60 and 62. Divided passage 100 communicates annular channels 94 of each of the bores with the admission and exhaust valves 54 and 56 while divided passage 102 communicates the other annular channels 96 of each bore to the suspension unit.

In general the operation of the device will be as follows:

With the vehicle at rest any load changes which may occur will cause a position signal to be transmitted to the leveling valve or valves. This position signal will cause the opening of the admission or exhaust valve and fluid will be valved into or released from the suspension unit at a fixed slow rate until the input signal is reduced to zero. If the vehicle is traveling along a straight highway and the wheels are raised or lowered by highway irregularities, the corresponding signal transmitted to the leveling valve will actuate the admission or exhaust valves but the slow flow rate in the lines between the leveling valve and the suspension unit, caused by the annular hydraulic restriction 98, will not permit any significant amount of fluid to be valved into or out of the suspensin unit. Thus under normal straight ahead driving conditions the suspension unit response rate is very slow because of the hydraulic restriction 98 and will not raise or lower the vehicle body unless the position signal lasts for a predetermined interval of time. Therefore, in effect, during straight ahead driving the suspension units will act only as shock absorbers. If, however, during acceleration or deceleration, the vehicle tends to assume a "squat" or "dive" attitude as a result of the inertia forces acting on the vehicle these same inertia forces will act on the inertia weight 82 tending to move it outside of its normal at rest position and cause shaft 84 to rotate and also move in an axial direction as a result of the spiral groove and ball means 90. If the movement of the weight is in a clockwise direction, the shaft 84 will move in a downward direction causing piston 66 to move and displace fluid from chamber 81 through check valve 80, simultaneously loading return spring 74 and communicating annular channels 94 and 96 of the bore 62 with each other, via annular channel 92 in the piston 66. As a result of this movement the capacity of the restricted passage 98 will have been enlarged and in effect an unrestricted connection between the leveling valve and the suspension unit will be provided. With the hydraulic restriction 98 rendered ineffective, a faster flow rate is provided in the lines, with a consequent faster suspension unit response rate. Movement of the weight 82 in a counterclockwise direction will cause the shaft 84 to move in an upward direction thereby moving piston 64 against spring 72 so as to communicate the annular channels 94 and 96 of the bore 60 with each other via the annular channel 92 of piston 64. It should be noted that the weight 82 is free at any time to move in its reverse direction without affecting the fast flow rate resulting from its first initial movement. This is because the restriction 76 in the piston provides the necessary delay for full vehicle correction to take place before spring 74 returns the piston to its normal restricting position. Thus when the inertia forces cease to act on the vehicle the annular hydraulic restriction will continue to be ineffective for a predetermined time interval so that any position signal opposite to those previously received can instantaneously valve fluid pressure into or relieve fluid pressure from the required suspension unit.

By controlling each of the front fluid suspension units by separate leveling valves each valve being controlled by an inertia controlled device such as I have described, vehicle "roll" attitudes can also be eliminated. Thus when the vehicle enters a curve in the road the centrifugal forces acting on the vehicle will also act on the inertia weight 82 (or weights) which controls each of the leveling valves of the type shown by the numeral 12 thereby causing the shaft 84 to move either the piston 64 or the piston 66, depending upon the direction of rotation of the weight. As previously discussed, movement of either one of the pistons will render the hydraulic restriction 98 ineffective and thereby permit a faster response upon the transmission of the position signal to the leveling valves. Thus, when the vehicle enters the curve and it begins to "roll," one of the suspension units will be relieved of pressure and the other will have more fluid pressure valved into it. When the vehicle leaves the curve, the unequal pressures in the two units which created a moment tending to oppose "roll" will tend to move the vehicle body into a "roll" position opposite to that previously assumed. Since restriction 76 of the pistons provides the necessary time delay before the annular hydraulic restriction 98 becomes operative once again, the position signals conveyed to the leveling valve will cause an instantaneous valving in and relieving of fluid from the appropriate suspension units to return the vehicle to its normal level position.

Anyone skilled in the art should appreciate that by insertion of the necessary pipe lines, as shown by the dotted portion of Figure 1, my inertia controlled mechanism can regulate the flow between a single leveling valve means and two or more suspension units. Also, by providing two annular channels on each of the pistons 64 and 66 and four annular channels in the bores 60 and 62, as shown in Figure 2, it is possible to regulate the flow between two independent leveling valve means and their associated suspension units by one inertia controlled mechanism. Furthermore, it should be understood that the hydraulic restriction means need not be placed between the leveling valves and suspension unit, as shown in Figure 1, but may be placed ahead of the leveling valves, as shown in Figure 2, and controlled by the same type of inertia controlled mechanism described above. In this situation a hydraulic restriction may be provided in both the inlet line and return line and an inertia controlled mechanism having double sets of annular channels on the pistons and in the bores, as previously described, would be required.

Referring more specifically to Figure 2, wherein like parts are given the same numerals plus 200, it will be seen that I have shown two independent leveling valves 212 of the type previously described which are utilized for regulating their associated suspension units 214. The valves and suspension units are shown in connection with a central hydraulic system having a pump 216, a reservoir 218, an accumulator charging valve 220 and an accumulator 222. Each of the leveling valves 212 has an inlet port 238, a return port 240 and a cylinder port 242. The position input signals obtained as a result of relative movement between the vehicle body and the wheels is transmitted to each of the leveling valves 212 through elastic means illustrated as leaf springs 248 in the manner previously described with respect to Figure 1. A single inertia controlled device which has been placed ahead of the leveling valves 212 is utilized to regulate the flow to both of the suspension units 214 and includes a bore 260 and a bore 262. Pistons 264 and 266 are reciprocable in the bores 260 and 262, respectively, and are urged against shoulders 268 and 270 by springs 272 and 274. In each of the pistons 264 and 266 is a restriction 276 and a passage 278 having a check valve 280 therein which communicate chambers 281 and 283 in each of the bores. As a result of having the restrictions and check valves, free flow of fluid through the pistons is permitted when the pistons move against the springs, and a restricted flow of fluid through the pistons when they are urged by the springs toward their respective shoulders. A weight 282 is pivotally connected to a rotatable and axially movable shaft 284 having flanges 286 and 288 abutting pistons 264 and 266 respectively. A spiral groove and ball means 290 is provided at one end of the shaft in order to provide axial movement of the shaft upon rotation thereof. Annular channels 292 and 293 are formed on each of the pistons 264 and 266 and annular channels 294, 295, 296 and 297 are formed on each of the bores 260 and 262. Annular channel 292 of each piston is associated with annular channels 294 and 296 of each of the bores, while annular channels 293 of each piston is associated with the other annular channels 295 and 297 of each of the bores. Annular hydraulic restriction 298 communicates annular channels 294 with the adjacent annular channels 296 of the respective bores, while annular hydraulic restriction 299 communicates annular channels 295 with the adjacent annular channels 297 of the respective bores. Divided passage 300 communicate annular channels 294 of each of the bores with the accumulator 222 while divided passage 302 communicates annular channels 296 of each bore with inlet ports 238 of leveling valves 212. Divided passage 304 communicates the return ports 240 of leveling valves 212 with annular channels 295 of each bore while divided passage 306 communicates annular channels 297 of each bore with the reservoir 218.

The operation of the Figure 2 embodiment is essentially the same as that of the Figure 1 embodiment and, therefore, will not be explained in great detail. With the inertia weight 282 in its normal at rest position fluid flow from the accumulator 222 to the suspension unit(s) 214 or from the suspension unit(s) to the reservoir 218, depending upon whether the admission or exhaust valves of the leveling valves 212 have been opened by the position signals transmitted thereto, will be at the slow flow rate since flow will have to be through annular hydraulic restrictions 298 and/or 299. If the inertia weight 282 moves away from its normal at rest position for any of the reasons previously described, the capacities of the annular hydraulic restrictions 298 and/or 299 will be enlarged in the manner previously described and a faster flow rate will result. The weight 282 is free at any time to move in its reverse direction without affecting the fast flow rate resulting from its first initial movement for the same reasons and in the same manner described with respect to Figure 1.

The leveling valve shown in the attached drawings is shown only for descriptive purposes as it is conceivable that this device would function equally well with leveling valves of different configurations. It is also conceivable that the mass 82 as shown in the drawing could also by use of appropriate linkages operate in more than one plane.

Although my invention has been described in connection with certain specific embodiments the principles are susceptible of numerous other applications that will readily occur to persons skilled in the art. Having thus described the various features of my invention what I claim as new and desire to secure by Letters Patent is:

1. In a fluid suspension system having suspension means, a pressure source, and a reservoir, an automatic leveling mechanism for regulating the rate of flow to and from said suspension means, said mechanism comprising a housing, an admission valve in said housing for communicating said suspension means with said pressure source, an exhaust valve in said housing for communicating said suspension means with said reservoir, actuating means for opening said admission and exhaust valves, first and second chambers formed in said housing, two annular channels formed in each of said chambers, first passage means communicating said admission and exhaust valves with one of the annular channels of each of said chambers, second passage means communicating the other of said annular channels of each of said chambers with said suspension means, restricted passage means communicating the annular channels of each of said chambers with each other, a piston reciprocable in each of said chambers for controlling the rate of flow between said suspension means and the admission and exhaust valves, an annular channel formed on each of said pistons for increasing the capacity of the passage means between the annular channels of each of said chambers upon movement of said pistons, means in each of said pistons for permitting free flow of fluid therethrough when said pistons move in one direction and restricting flow of fluid therethrough when said pistons move in the opposite direction, a rotatable and axially movable shaft associated with said pistons for moving one of said pistons in one direction and the other of said pistons in the opposite direction, resilient means associated with each of said pistons for opposing movement thereof in one direction, a weight movable from a normally neutral position as a result of inertia forces acting thereon, said weight being connected to said shaft for imparting rotative motion thereto, and means associated with said shaft for imparting axial motion to said shaft upon rotation thereof.

2. In a fluid suspension system having suspension means, leveling valve means, and actuating means for actuating said valve means, an inertia controlled device for controlling the rate of flow between said leveling valve means and said suspension means, said device comprising first and second chambers, first passage means communicating said valve means with each of said chambers, second passage means communicating each of said chambers with said suspension means, two restricted passages communicating said first and second passage means with each other, a first piston reciprocable in one of said chambers and associated with one of said restricted passages, a second piston reciprocable in the other of said chambers and associated with the other of said restricted passages, movement of either of said pistons from a normally neutral position increasing the capacity of the associated restricted passage, means in each of said pistons for permitting free flow of fluid therethrough when said pistons move in one direction and restricting flow of fluid therethrough when said pistons move in the opposite direction, resilient means associated with each of said pistons for opposing movement thereof, means associated with each of said pistons for moving one of said pistons in one direction and the other of said pistons in the other direction, and a mass movable from a normally neutral position as a result of inertia forces acting thereon, said mass being connected to said last mentioned means for imparting motion to said pistons.

3. An inertia controlled device for controlling the rate of flow between said leveling valve means and said suspension means as defined in claim 2 wherein said restricted passages are formed by each piston and its associated chamber.

4. In a fluid suspension system having suspension means, a pressure source, and a reservoir, an automatic leveling mechanism having a variable response rate for regulating the pressure in said suspension means, said mechanism comprising an admission valve for communicating said suspension means with said pressure source, an exhaust valve for communicating said suspension means with said reservoir, passage means connecting said admission and exhaust valves with said suspension means, actuating means for opening said admission and exhaust valves, damping means located in said passage means for retarding the admission or exhaust of pressurized fluid to or from the suspension means, dashpot means associated with said damping means, said dashpot means having first and second chambers, a piston reciprocable in each of said first and second chambers for controlling the action of said damping means, means for communicating the opposite sides of each of said pistons with each other, said last named means permitting free flow of fluid therethrough when said pistons move in one direction and restricting flow of fluid therethrough when said pistons move in the opposite direction, inertia controlled means associated with said pistons for moving one of said pistons in one direction and the other of said pistons in the opposite direction, movement of said pistons rendering said damping means ineffectual thereby permitting an increase in the rate of admission or exhaust of pressurized fluid to or from the suspension means, and resilient means associated with each of said pistons for opposing movement thereof.

5. In a fluid suspension system having suspension means, leveling valve means, and actuating means for actuating said valve means, an inertia controlled device for controlling the rate of flow between the valve means and said suspension means, said device comprising first and second chambers, first passage means communicating said valve means with each of said chambers, second passage means communicating each of said chambers with said suspension means, third passage means communicating said first and second passage means with each other, a piston reciprocable in each of said chambers, movement of either of said pistons from its normally neutral position increasing the capacity of said third passage means, thereby increasing the rate of flow to or from said suspension means, means in each of said pistons for permitting free flow of fluid therethrough when said pistons move in one direction and restricting flow of fluid therethrough when said pistons move in the opposite direction, resilient means associated with each of said pistons for opposing movement thereto, and means for causing movement of said piston means as a result of inertia forces acting thereon.

6. In a fluid suspension system having suspension means, leveling valve means, and actuating means for actuating said valve means, an inertia controlled device for controlling the rate of flow between said suspension means and said leveling valve means, said device comprising chamber means, first passage means communicating said valve means with said chamber means, second passage means communicating said chamber means with said suspension means, third passage means communicating said first and second passage means with each other, piston means reciprocable in said chamber means, movement of said piston means from a normally neutral position increasing the capacity of said third passage means, inertia controlled means movable from a first to a second position for causing movement of said piston means only in one direction from its normally neutral position, and dashpot means associated with said piston means for retarding the return of said piston means to its normally neutral position but permitting free movement of said inertia controlled means to and from its first position.

7. In a fluid suspension system having suspension means, a pressure source, and a reservoir, an automatic leveling mechanism for regulating the rate of flow to and from said suspension means, said mechanism comprising an admission valve for communicating said suspension means with said pressure source, an exhaust valve for communicating said suspension means with said reservoir, passage means for connecting said admission and exhaust valves with said suspension means, actuating means for opening said admission and exhaust valves, means located in said passage means for restricting the flow of fluid to said suspension means to a predetermined rate, means movable from a normally neutral position for increasing the rate of flow to said suspension means above said predetermined rate, control means movable from a first to a second position for causing movement of said movable means only in one direction from its normally neutral position, and dashpot means associated with said movable means for retarding the return of said movable means to its normally neutral position but permitting free movement of said control means to and from its first position.

8. In a fluid suspension system having suspension means, a pressure source, and a reservoir, an automatic leveling mechanism for regulating the rate of flow to and from said suspension means, said mechanism comprising an admission valve for communicating said suspension means with said pressure source, an exhaust valve for communicating said suspension means with said reservoir, actuating means for opening said admission and exhaust valves, passage means for connecting said pressure source and reservoir with said suspension means, means located in said passage means for restricting the flow of fluid to and from said suspension means to a predetermined rate, means movable from a normally neutral position for increasing the rate of flow to and from said suspension means above said predetermined rate, control means movable from a first to a second position for causing movement of said movable means only in one direction from its normally neutral position, and dashpot means associated with said movable means for retarding the return of said movable means to its normally neutral position but permitting free movement of said control means to and from its first position.

9. In a fluid suspension system having suspension means, a pressure source, a reservoir, leveling valve means, and actuating means for actuating said valve means, an inertia controlled device for regulating the rate of flow to and from said suspension means, said device comprising first and second chambers, first passage means communicating said pressure source and reservoir with each of said chambers, second passage means communicating each of said chambers with said suspension means, third passage means communicating said first and second passage means with each other, a piston reciprocable in each of said chambers, movement of either of said pistons from its normally neutral position increasing the capacity of said third passage means, thereby increasing the rate of flow to or from said suspension means, means in each of said pistons for permitting free flow of fluid therethrough when said pistons move in one direction and restricting flow of fluid therethrough when said pistons move in the opposite direction, means associated with each of said pistons for opposing movement thereof, and means for causing movement of said pistons as a result of inertia forces acting thereon.

10. In a fluid suspension system having suspension means, a pressure source, a reservoir, leveling valve means, and actuating means for actuating said valve means, a device for regulating the rate of flow to and from said suspension means, said device including a chamber, first passage means communicating said pressure source and reservoir with said chamber, second passage means communicating said chamber with said suspension means, third passage means communicating said first and second passage means with each other, a piston reciprocable in said chamber, movement of said piston from its normally neutral position increasing the capacity of said third passage means, thereby increasing the rate of flow to or from said suspension means, means in said piston for permitting free flow of fluid therethrough when said piston moves in one direction and restricting flow of fluid therethrough when said piston moves in the opposite direction, means associated with said piston for opposing movement thereof, and means associated with said piston for causing movement thereof.

11. In a fluid suspension system having suspension means, a pressure source, a reservoir, leveling valve means, and actuating means for actuating said valve means, a device for regulating the rate of flow to and from said suspension means, said device comprising a housing, first and second chambers formed in said housing, four annular channels formed in each of said chambers, first passage means communicating said pressure source with a first of the annular channels of each of said chambers, second passage means communicating said reservoir with a second of the annular channels of each of said chambers, third passage means communicating the third and fourth of said annular channels with said suspension means, first restricted passage means communicating the first and third annular channels of each of said chambers with each other, second restricted passage means communicating the second and fourth annular channels of each of said chambers with each other, a piston reciprocable in each of said chambers, a first annular channel formed on each of said pistons for increasing the capacity of the first restricted passage means upon movement of said pistons, a second annular channel formed on each of said pistons for increasing the capacity of the second restricted passage means upon movement of said pistons, means in each of said pistons for permitting free flow of fluid therethrough when said pistons move in one direction and restricting flow of fluid therethrough when said pistons move in the opposite direction, means associated with said pistons for opposing movement thereof, and means associated with said pistons for causing movement thereof.

12. In a fluid suspension system having suspension means, a pressure source, and a reservoir, leveling mechanism for regulating the rate of flow to and from said suspension means, said mechanism comprising an admission valve for communicating said suspension means with said pressure source, an exhaust valve for communicating said suspension means with said reservoir, actuating means for opening said admission and exhaust valves, first passage means connecting said admission valve with said pressure source, second passage means connecting said exhaust valve with said reservoir, means located in said first passage means for restricting flow of fluid from said pressure source to said suspension means to a predetermined rate, means located in said second passage means for restricting the flow of fluid from said suspension means to said reservoir to a predetermined rate, means movable from a normally neutral position for increasing the rate of flow in said first and second passage means above said predetermined rate, and dashpot means associated with said movable means for retarding the return of said movable means to its normally neutral position.

References Cited in the file of this patent
UNITED STATES PATENTS

| | | |
|---|---|---|
| 2,778,656 | May | Jan. 22, 1957 |
| 2,787,475 | Jackson | Apr. 2, 1957 |
| 2,849,225 | Lucien | Aug. 26, 1958 |